US012386377B1

(12) United States Patent
Lin

(10) Patent No.: US 12,386,377 B1
(45) Date of Patent: Aug. 12, 2025

(54) SYSTEMS, METHODS, AND DEVICES FOR MULTI-REFERENCE VOLTAGE GENERATORS

(71) Applicant: Cypress Semiconductor Corporation, San Jose, CA (US)

(72) Inventor: Adrian Lin, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 301 days.

(21) Appl. No.: 18/307,568

(22) Filed: Apr. 26, 2023

(51) Int. Cl.
*G05F 3/24* (2006.01)
*G05F 1/46* (2006.01)
*G05F 3/26* (2006.01)

(52) U.S. Cl.
CPC ................ *G05F 3/24* (2013.01); *G05F 1/468* (2013.01); *G05F 3/262* (2013.01)

(58) Field of Classification Search
CPC ........... G05F 31/468; G05F 3/24; G05F 3/262
See application file for complete search history.

(56) References Cited

U.S. PATENT DOCUMENTS

2003/0011351 A1* 1/2003 Shim ........................ G05F 3/245 323/316
2006/0197585 A1* 9/2006 Kim ........................ G05F 3/245 327/539
2008/0303504 A1* 12/2008 Kang ........................ G05F 3/30 323/313
2015/0205319 A1* 7/2015 De Cremoux .......... G05F 3/262 331/109

* cited by examiner

*Primary Examiner* — Jue Zhang
*Assistant Examiner* — Lakaisha Jackson

(57) ABSTRACT

Systems, methods, and devices generate multiple reference voltages. Methods include receiving, at a voltage regulator, a voltage from a voltage source, and generating, using the voltage regulator, a tracking current based on the received voltage, the tracking current having an amplitude that tracks changes in a voltage level of the voltage source. Methods also include generating, using the voltage regulator, a first reference voltage based on the tracking current, the first reference voltage being a designated voltage less than the voltage source and tracking changes in the voltage level of the voltage source, and generating, using the voltage regulator, a second reference voltage based on the received voltage, the second reference voltage being a fixed voltage.

20 Claims, 7 Drawing Sheets

SYSTEMS, METHODS, AND DEVICES FOR MULTI-REFERENCE VOLTAGE GENERATORS

TECHNICAL FIELD

This disclosure relates to reference voltage generators, and more specifically, to improvement of generation of multiple reference voltages by such reference voltage generators.

BACKGROUND

Digital circuits may include various components, such as transistors. Such transistors may have physical parameters and characteristics that determine permissible operational voltages for such transistors. For example, a configuration and implementation of a gate oxide may determine a maximum voltage that may applied to the transistor before it is damaged. Moreover, digital circuits may include different transistor devices that have different maximum permissible voltages. Conventional techniques for providing power to such transistors remain limited because they are not able to efficiently provide power to transistors having different maximum permissible voltages while also accounting for variances in a voltage level of a power supply.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Transistors have physical characteristics and parameters that determine a maximum gate-to-source voltage that the transistor can tolerate before it is damaged. For example, some transistors may have gate oxide configurations that allow 1.8V while some allow 2.5V. Moreover, both 1.8V transistors and 2.5V transistors may be implemented in the same device. Accordingly, such devices typically use two separate reference voltages, also referred to herein as voltage rails. Conventional techniques for generating such reference voltages remain limited because they may utilize multiple power supplies, and thus require additional hardware that is both costly and occupies additional space on a chip. Moreover, conventional techniques are limited in their ability to ensure a reference voltage does not exceed a maximum gate-to-source voltage and cause damage to transistors on the chip.

Embodiments disclosed herein provide the ability to generate multiple reference voltages from a single power supply, and with relatively little power consumption. As will be discussed in greater detail below, a power supply, which may be a battery, may be coupled to a first reference voltage generator which generates a variable reference voltage. In various embodiments, the reference voltage generator is configured to generate a tracking current that tracks variations in the power supply, as may occur when a battery loses charge. The tracking current may be used to generate the variable reference voltage which may also be a floating rail. The battery may also be coupled to a second reference voltage generator that is configured to generate a fixed reference voltage which may also be a fixed rail. Thus, as will be discussed in greater detail below, a single power supply, which may be a battery, may be used to generate multiple reference voltages, in a low-power implementation that uses fewer resources.

Figure 1:
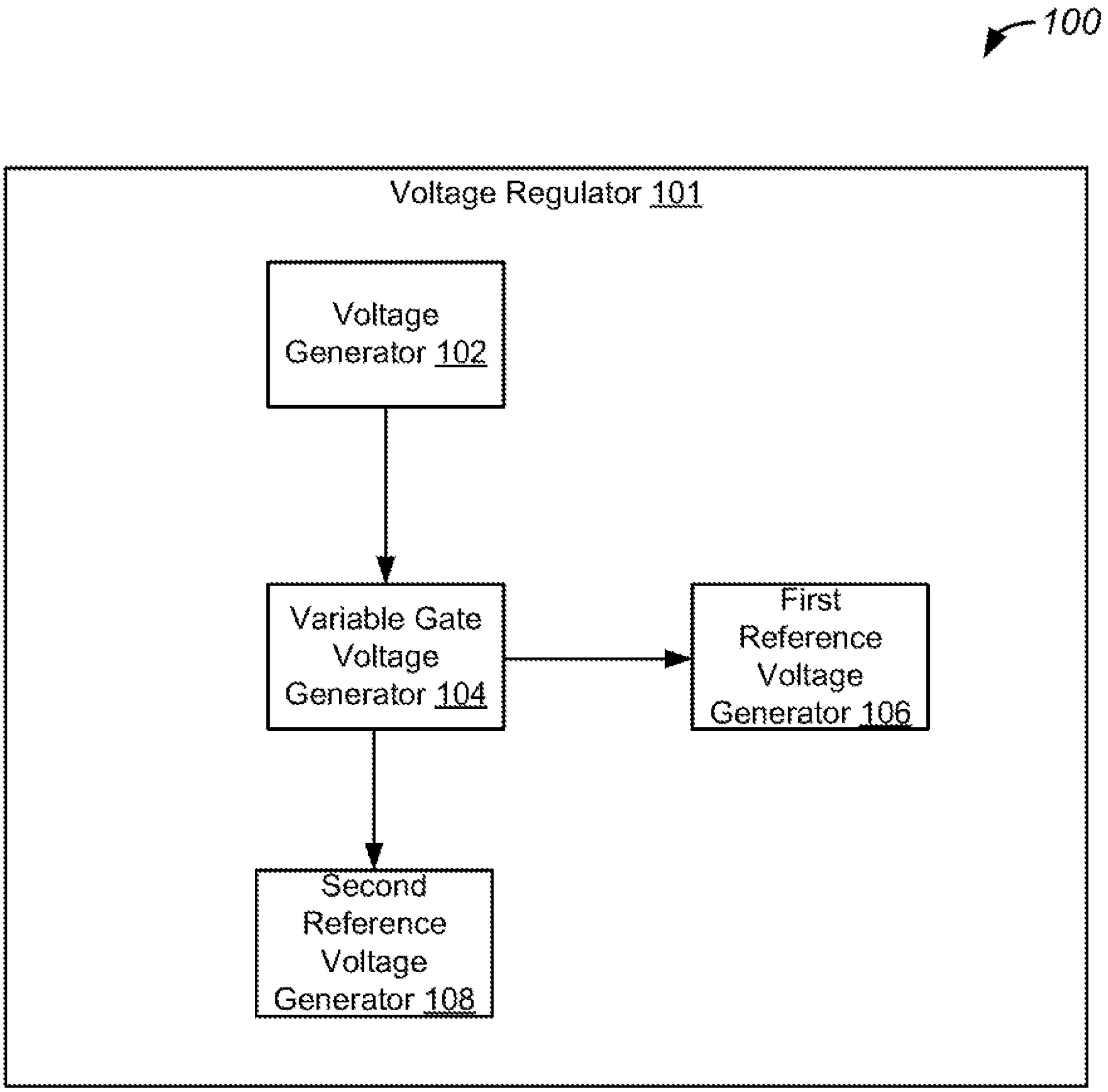
FIG. 1 illustrates an example of a voltage regulator, configured in accordance with some embodiments.

FIG. 1 illustrates an example of a voltage regulator, configured in accordance with some embodiments. As will be discussed in greater detail below, a device, such as device 100, may include voltage regulator 101 which is configured to generate reference voltages used as power rails for other components that may be coupled to voltage regulator 101. In various embodiments, voltage regulator 101 may be configured to generate multiple reference voltages that may include a floating rail and a fixed rail, and such reference voltages may be generated from a single power supply. As will be discussed in greater detail below, the floating rail may be generated such that it is not subjected to minimum voltage constraints of transistor devices, and instead provides a broad operational range for such transistor devices.

In various embodiments, voltage regulator 101 includes voltage generator 102 which may be a power supply. Accordingly, as discussed above, voltage generator 102 may be a battery or other power source included in a system or device. In various embodiments, when voltage generator 102 is configured as a battery, an output of voltage generator 102 may vary over time as a power is discharged from the battery, and a voltage of the battery diminishes. Accordingly, an output of voltage generator 102 may vary over time in accordance with one or more discharge parameters. It will be appreciated that voltage generator 102 may also be coupled to other components of a system or device that includes voltage regulator 101. Accordingly, an output of voltage generator 102 may be available to other components as a power supply.

Voltage regulator 101 additionally includes variable gate voltage generator 104 which may be coupled to first reference voltage generator 106. As will be discussed in greater detail below, first reference voltage generator 106 may be used to generate a first reference voltage that tracks variations in an output of voltage generator 102. Accordingly, the first reference voltage may be a floating voltage, also referred to herein as a floating rail. As will also be discussed in greater detail below, first reference voltage generator 106 generates the floating rail to maintain a constant voltage difference with respect to the output of voltage generator 102. For example, first reference voltage generator 106 may generate a first reference voltage that is a maximum of 1.8V less than the voltage generated by voltage generator 102.

As will be discussed in greater detail below, variable gate voltage generator 104 is configured to use an energy source vary a gate voltage of one or more transistors of first reference voltage generator 106 to induce variations in the first reference voltage in a manner that track voltage generator 102. Accordingly, as will be discussed in greater detail below with reference to FIG. 2 and FIG. 3, variable gate voltage generator 104 includes one or more components configured to track variations of voltage generator 102, and generate a tracking current and/or voltage that is used to vary a gate voltage of first reference voltage generator 106, and thus vary an output of first reference voltage generator 106.

In various embodiments, variable gate voltage generator 104 may also be coupled to second reference voltage generator 108. As will be discussed in greater detail below, second reference voltage generator 108 is configured to generate a second reference voltage. More specifically, the second reference voltage may be a fixed voltage also referred to herein as a fixed rail. In one example, second reference voltage generator 108 is configured to generate a fixed voltage of 1.8V despite variations in an output of voltage generator 102. In various embodiments, variable gate voltage generator 104 activates a transistor included in second reference voltage generator 108 to generate the second reference voltage, as will be discussed in greater detail below with reference to FIG. 4.

Figure 2:
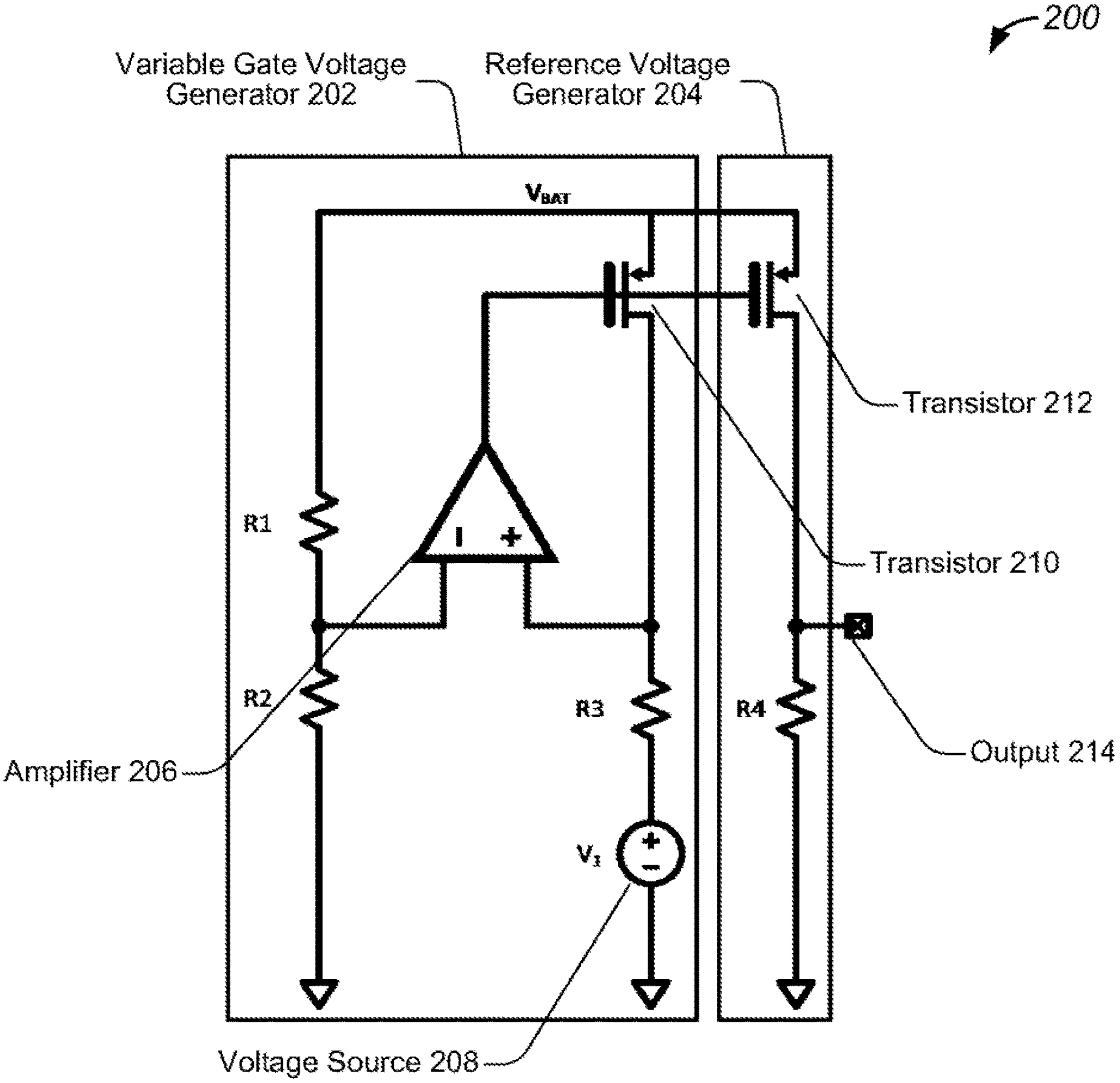
FIG. 2 illustrates an example of a reference voltage generator, configured in accordance with some embodiments.

FIG. 2 illustrates an example of a reference voltage generator, configured in accordance with some embodiments. As will be discussed in greater detail below, a variable gate voltage generator, such as variable gate voltage generator 202, may be configured to vary a gate voltage of a transistor in a manner that tracks variances in a power supply voltage, such as that of a battery. Varying the gate voltage in this manner allows the transistor to be used to generate a reference voltage that varies in accordance with the power supply, and may be used a floating rail.

As discussed above, a floating rail may be configured to maintain a designated voltage difference from a power supply voltage that may vary. In one example, the designated voltage difference may be 1.8V to ensure a voltage drop between gate to source $V_{GS}$ of a transistor is not too large. Accordingly, a reference voltage used as a floating rail may be expressed as $V_{SSHV}=V_{BAT}-V_{GS}$. When viewed in the context of the implementation shown in FIG. 2, the reference voltage output by a reference voltage generator, such as reference voltage generator 204, may be given by equation 1 shown below.

$$V_{SSHV} = \left(\frac{V_{BAT}}{k} - \frac{V_{GS}}{k}\right)\cdot\frac{1}{R}\cdot k\cdot R \qquad (1)$$

In equation 1, $V_{SSHV}$ refers to the reference voltage used as a floating rail. $V_{BAT}$ refers to a voltage of the power supply, which may be a battery, and $V_{GS}$ refers to a gate to source voltage drop across a transistor which, as similarly discussed above, may be a function of a gate oxide of the transistor. Accordingly, $V_{GS}$ may be determined based on characteristics of the construction of the transistor, and may be a voltage value such as 1.8V. R may be $R_3$ shown in FIG. 2. Moreover, the constant k may be determined based on equation 2 shown below.

$$k = \frac{R_2}{R_1 + R_2} \qquad (2)$$

Furthermore, values of resistor $R_4$ may be given by equation 3 4 shown below.

$$R_4 = kR = \frac{R_2 R_3}{R_1 + R_2} \qquad (3)$$

Moreover, a voltage of voltage source 208 may be given by equation 4 shown below.

$$V_1 = \frac{V_{GS}}{k} = V_{GS}\left(\frac{R_1 + R_2}{R_2}\right) \qquad (4)$$

As shown in FIG. 2, amplifier 206 is configured to be coupled to transistor 210, and to implement closed loop feedback. Thus, amplifier 206 is configured as a one-stage differential amplifier. In various embodiments, an output of amplifier 206 is determined based on a difference between $V_{BAT}$ and a designated voltage of voltage source 208, as well as the values of $R_1$ and $R_3$. The implementation of amplifier 206 in this manner enables the output provided to transistor 212 to activate and control operation of transistor 212 to generate a reference voltage at output 214 while also ensuring that the reference voltage is bounded within a particular operational range that may be determined, at least in part, by voltage source 208. As discussed above, the reference voltage may be generated for an operational range of $V_{BAT}$ that is 1.8 V<$V_{BAT}$<4.8 V. In this way, amplifier 206 may enable the generation of the floating voltage as well as ceasing generation of such floating voltage when $V_{BAT}$ falls below 1.8V. In various embodiments, the closed loop feedback formed by amplifier 206, transistor 210 and resistors R1, R2, and R3 ensures the gate voltage of transistor 210 falls below cut-off region thus clamping the drain current into R3 to zero when $V_{BAT}$ falls below 1.8 V. Consequently, since the output of amplifier 206 is provided to the gate of transistor 212, this drain current is mirrored into R4 such that the reference voltage $V_{SSHV}$ is also clamped to 0 V.

In various embodiments, the total current consumption of variable gate voltage generator 202 and reference voltage generator 204 is less than 100 nA. Accordingly, the current draw used by amplifier 206 and other components shown in FIG. 2 is relatively small compared to other techniques. In various embodiments, the values of R1, R2, and R3 are determined by one or more desired or target operating conditions, as well as current consumption characteristics and process variations. Accordingly, such values may be determined by an entity, such as a manufacturer during a design and testing process.

Figure 3:
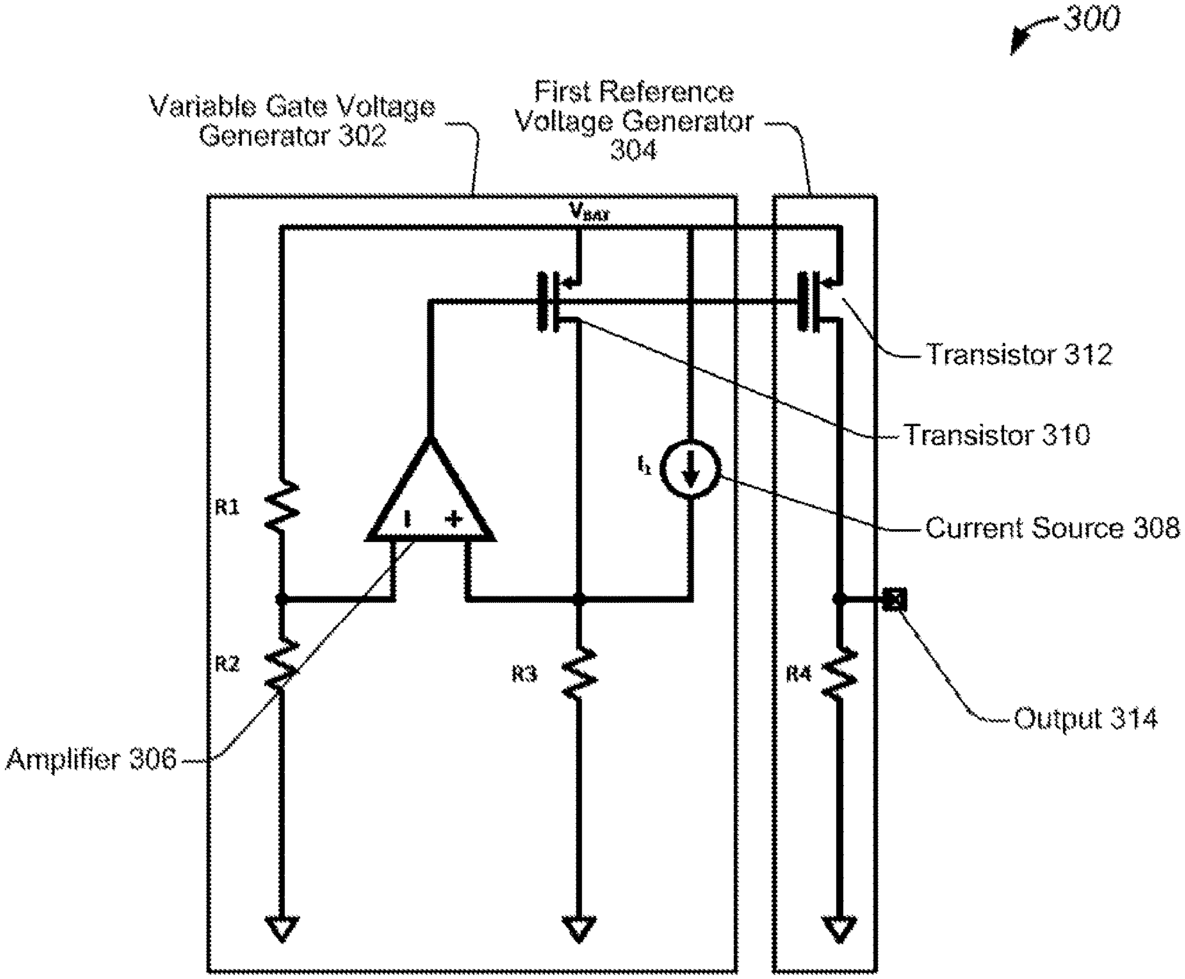
FIG. 3 illustrates another example of a reference voltage generator, configured in accordance with some embodiments.

FIG. 3 illustrates another example of a reference voltage generator, configured in accordance with some embodiments. As similarly discussed above, a variable gate voltage generator, such as variable gate voltage generator 302, may be configured to vary a gate voltage of a transistor in a manner that tracks variances in a power supply voltage, such as that of a battery. As will be discussed in greater detail below, a current source, such as current source 308, may be implemented to generate a tracking current, and ultimately generate a reference voltage that may be used as a floating rail. In some embodiments, a value of a current generated by current source 308 may be given by equation 5 shown below. Values of other variables and constants may be determined as discussed above with reference to FIG. 2.

$$I_1 = \frac{V_{GS}}{kR} = V_{GS}\left(\frac{R_1 + R_2}{R_2 R_3}\right) \tag{5}$$

As similarly discussed above, amplifier 306 is configured to be coupled to transistor 310, and to implement closed loop feedback. Moreover, amplifier 306 provides an output to transistor 312 to activate and control operation of transistor 312 to generate a reference voltage at output 314 while also ensuring that the reference voltage is bounded within a particular operational range that may be determined, at least in part, by current source 308. As discussed above, the reference voltage may be generated for an operational range of $V_{BAT}$ that is 1.8 V<$V_{BAT}$<4.8 V. In this way, amplifier 306 may enable the generation of the floating voltage as well as ceasing generation of such floating voltage when $V_{BAT}$ falls below 1.8V. Current source 308 may come directly from system bandgap reference thus allowing low power integration without a voltage buffer.

Figure 4:
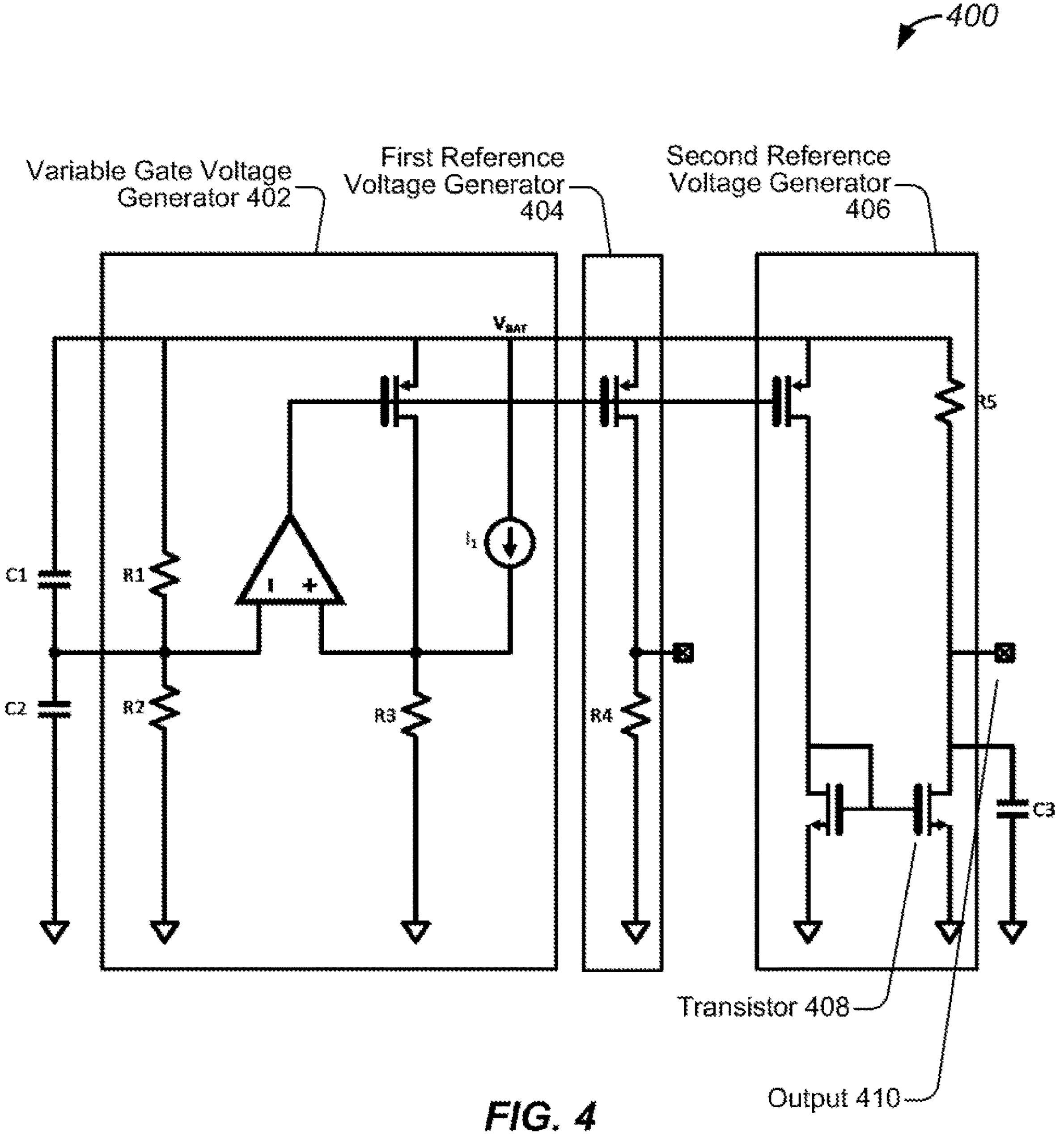
FIG. 4 illustrates an example of a multiple reference voltage generator, configured in accordance with some embodiments.

FIG. 4 illustrates an example of a multiple reference voltage generator, configured in accordance with some embodiments. As similarly discussed above, variable gate voltage generator 402 and first reference voltage generator 404 may be used to generate a first reference voltage that tracks variations in a power supply, and is a floating voltage rail. As will be discussed in greater detail below, second reference voltage generator 406 may be used to generate a second reference voltage that is a fixed voltage rail. Accordingly, both a floating rail and a fixed rail may be generated based off of a single power supply and with relatively little current draw.

As shown in FIG. 4, second reference voltage generator 406 may include transistor 408 which may have a source coupled to a circuit ground, and output 410 may be coupled to a drain of transistor 408, which may be an N-type metal-oxide-semiconductor field-effect transistor, also referred to herein as an NMOS device. Transistor 408 mirrors the current that flows into R4, thus the mirrored current flows across R5 producing an identical voltage drop across R5. Accordingly, output 410 may be held constant at 1.8 V as a fixed rail. In various embodiments, the overall current draw of voltage regulator 400 is about 130 nA. Accordingly, both reference voltage are generated using relatively low power. Thus, the fixed rail will be held constant at 1.8 V over a range of $V_{BAT}$ from 1.8V to 4.8V and will be equal to $V_{BAT}$ for $V_{BAT}$<1.8 V.

Figure 5:
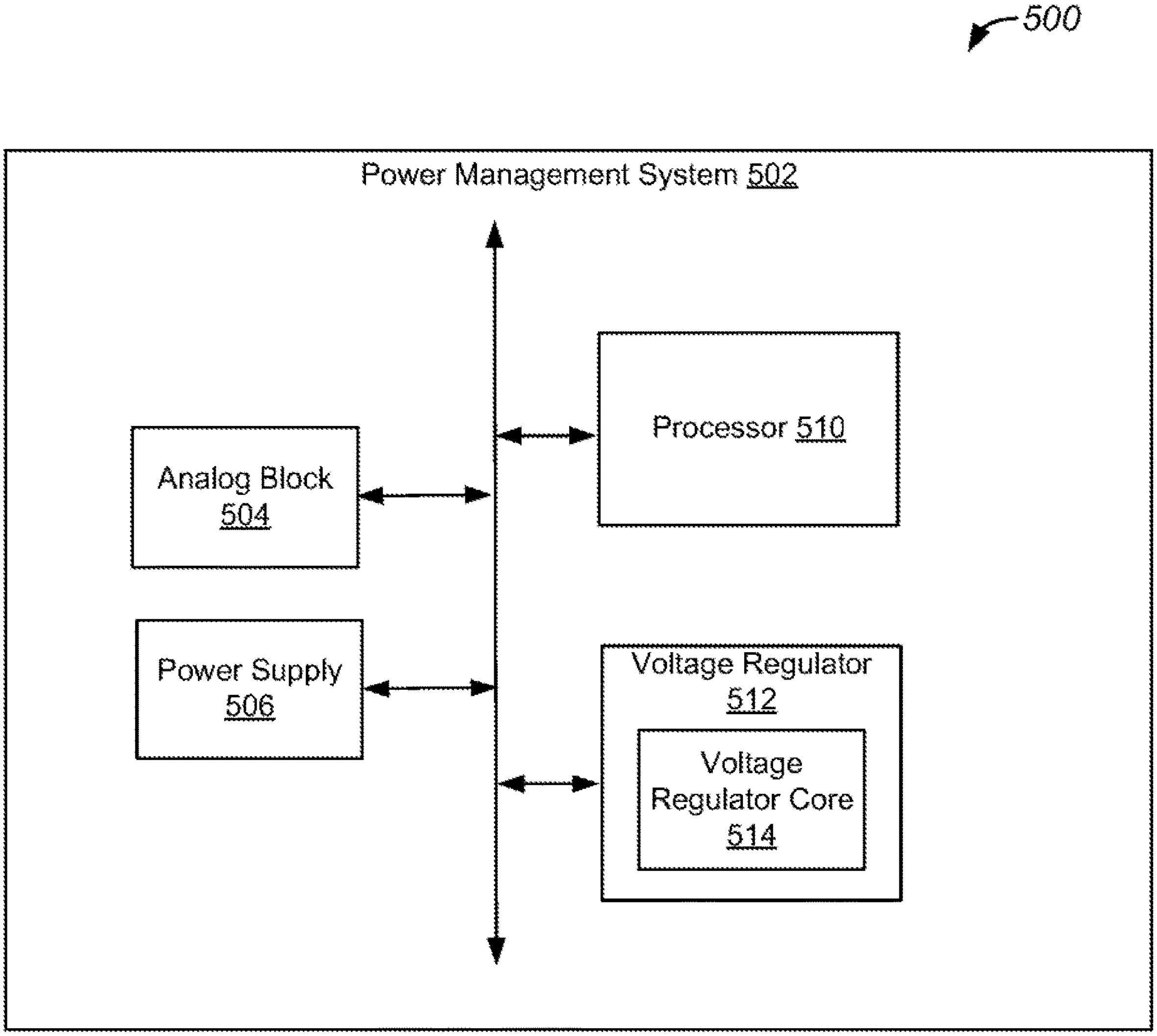
FIG. 5 illustrates an example of a power management system, configured in accordance with some embodiments.

FIG. 5 illustrates an example of a power management system, configured in accordance with some embodiments. As will be discussed in greater detail below, a system, such as system 500, may include power management system 502 which is configured to generate reference voltages used as power rails for other components that may be coupled to power management system 502. As similarly discussed above, multiple reference voltages may be generated such that a floating rail and a fixed rail may be generated from a single power supply.

Power management system 502 includes power supply 506 which may include a voltage generator, as discussed above. Accordingly, power supply 506 may include one or more batteries which may be used to provide power for a system or device that includes power management system 502. As similarly discussed above, power management system 502 may also include voltage regulator 512 which may be configured to generate reference voltages as disclosed herein. Accordingly, voltage regulator 512 may include processing elements and circuitry configured to generate a floating rail and a fixed rail. For example, voltage regulator 512 may include voltage regulator core 514 that includes such processing elements and circuitry.

Power management system 502 further includes processor 510 which may be configured to include processing elements configured to perform processing operations for the system or device that includes power management system 502. Accordingly, processor 510 may be a microcontroller, or any other suitable processing device, such as programmable logic, firmware, or application specific integrated circuit (ASIC). In various embodiments, power management system 502 additionally includes analog block 504 which may be configured to include various buffers, muxes, and other components that may be used by power management system 502.

Figure 6:
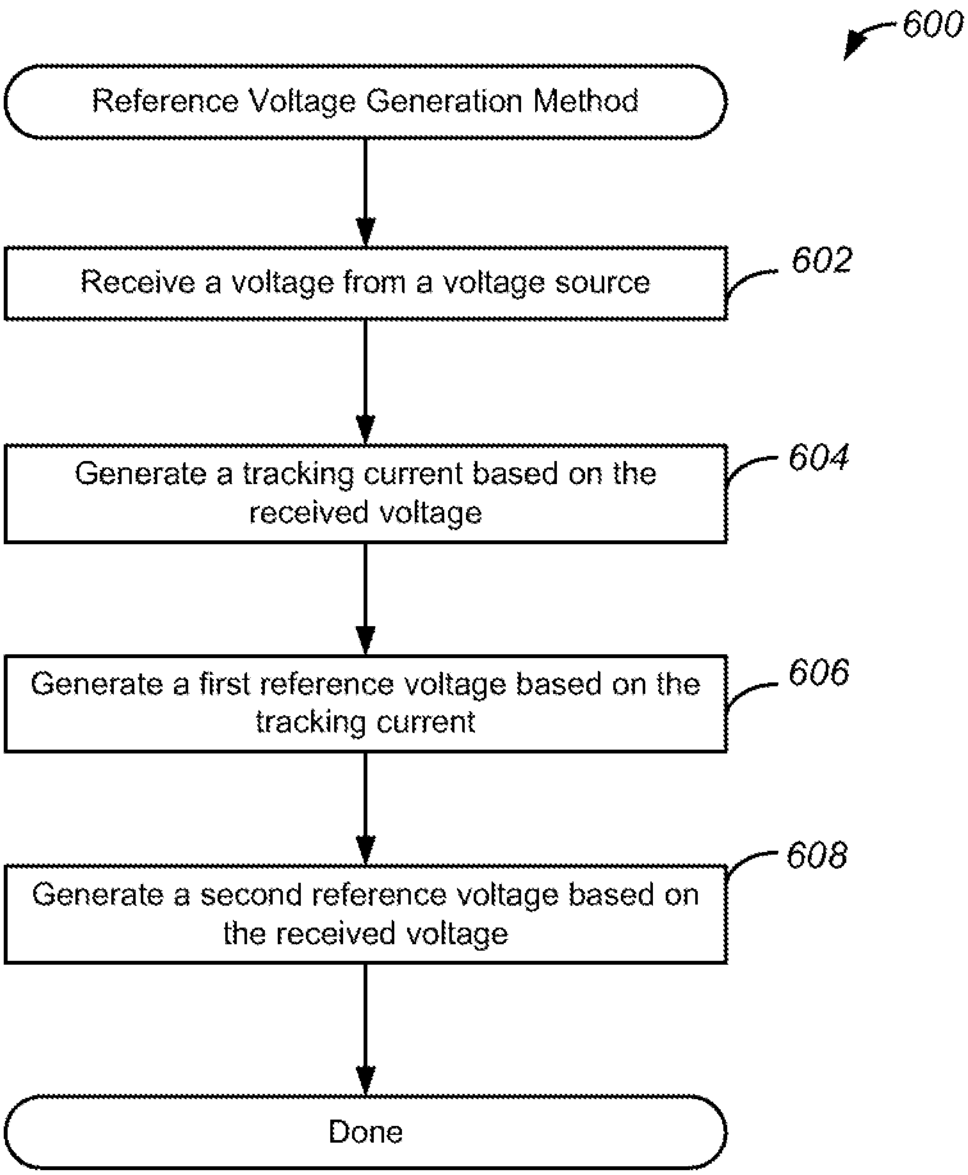
FIG. 6 illustrates an example of a method for reference voltage generation, performed in accordance with some embodiments.

FIG. 6 illustrates an example of a method for reference voltage generation, performed in accordance with some embodiments. As will be discussed in greater detail below, a method, such as method 600, may be performed to generate reference voltages used as power rails for various system components. As similarly discussed above, multiple reference voltages may be generated that include a varying reference voltage and a fixed reference voltage, and such reference voltages may be generated from a single power supply.

Method 600 may perform operation 602 during which a voltage may be received from a voltage source. As discussed above, the voltage source may be a power supply. In one example the power supply is included in a mobile or wireless device, and the power supply is a battery. Accordingly, the voltage may be provided from the battery to a component of a power management system, such as a regulator.

Method 600 may perform operation 604 during which a tracking current may be generated based on the received voltage. Accordingly, one or more components, such as a variable gate voltage generator may modulate a gate voltage of a transistor to generate a tracking current that follows variations in the power supply. For example, the voltage level of a power supply may decrease over time. Accordingly, the tracking current that is generated may also diminish in a manner that tracks the voltage level of the power supply such that an amplitude of the tracking current tracks changes in the voltage level of the power supply.

Method 600 may perform operation 606 during which a first reference voltage may be generated based on the tracking current. In some embodiments, the tracking current is used to pass a current through a first resistor, and a terminal at an end of the first resistor is used as a first output corresponding to a first reference voltage. Because the voltage drop across the transistor remains constant, as determined by the first transistor's physical parameters, the first reference voltage tracks the voltage level of the battery minus the voltage drop across the first transistor. Thus, the first reference voltage is a variable reference voltage that tracks variations in the power supply.

Method 600 may perform operation 608 during which a second reference voltage is generated based on the received voltage. According to some embodiments, the received voltage may also be provided to a second transistor via a second resistor. In one example, a source of the second transistor is coupled to circuit ground, and the drain is coupled to the second resistor. Moreover, a second output is taken from the drain of the second transistor and used as a second reference voltage. As similarly discussed above, the voltage drop across the second transistor remains constant, and thus holds the second reference voltage to a constant value.

Figure 7:
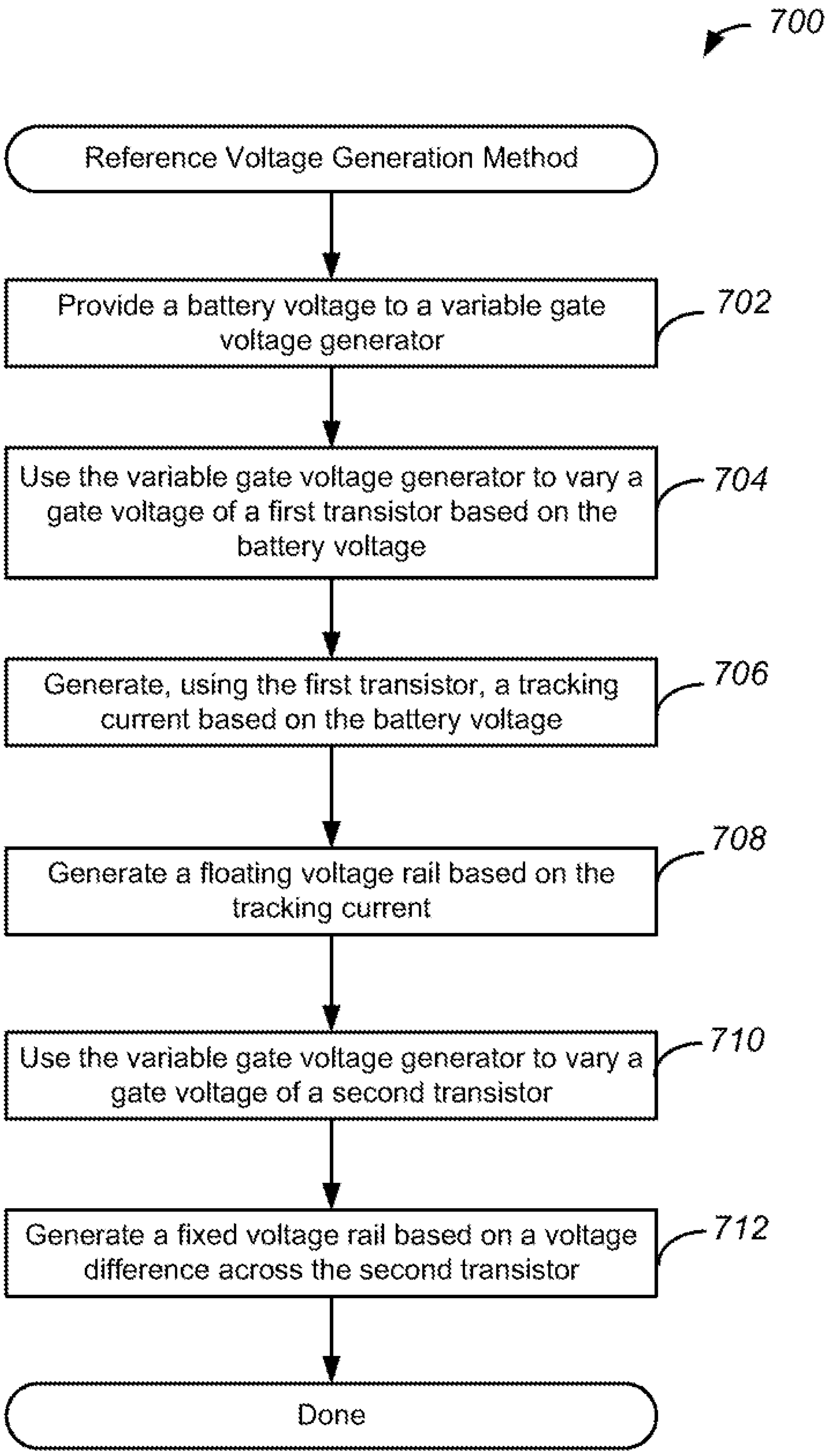
FIG. 7 illustrates another example of a method for reference voltage generation, performed in accordance with some embodiments.

FIG. 7 illustrates another example of a method for reference voltage generation, performed in accordance with some embodiments. As similarly discussed above, a method, such as method 700, may be performed to generate reference voltages used as power rails for various system components. As will be discussed in greater detail below, multiple reference voltages may be generated that are configured to provide a floating rail and a fixed rail to various components of a device, such as a wireless device.

Method 700 may perform operation 702 during which a battery voltage may be provided to a variable gate voltage generator. As discussed above, a power supply may be included in a mobile or wireless device. In such an example, the power supply is a battery, and a voltage may be provided from the battery to a component of a power management system, such as a regulator. In various embodiments, the battery voltage is provided to a variable gate voltage generator which is configured to generate a gating voltage that tracks variations in the voltage level of the battery.

Method 700 may perform operation 704 during which the variable gate voltage generator is used to vary a gate voltage of a first transistor based on the battery voltage. In some embodiments, the variable gate voltage generator includes an amplifier configured as a differential amplifier that generates an output voltage based on a difference detected at two input terminals. As discussed above, the input terminals are coupled to, among other things, the battery voltage and another energy source, such as a voltage source or a current source. Accordingly, the output of the amplifier may be determined based on a relationship between the battery voltage and the energy source that is set to a designated value. For example, the energy source may be a voltage source set at a designated voltage configured to apply a designated voltage to a positive terminal of the amplifier. In some embodiments, the designated voltage corresponds to a voltage constraint of a transistor, as discussed above. The energy source may also be a current source that is configured in a similar manner. Accordingly, during operation 704 the voltages at the input terminals of the amplifier cause the amplifier to generate an output that is provided to a first transistor.

Method 700 may perform operation 706 during which the first transistor is used to generate a tracking current based on the battery voltage. Accordingly, the output of the variable gate voltage generator is used to set a gate voltage of the first transistor, and the first transistor generates a current in accordance with the received gate voltage. The generated current is dependent upon the received gate voltage, and thus varies in accordance with and tracks variations in the battery voltage.

Method 700 may perform operation 708 during which a floating voltage rail is generated based on the tracking current. As discussed above, the tracking current is passed to a resistor, and a first output may be taken at a terminal of the resistor such that the voltage at the first output is the battery voltage minus the voltage drop across the first transistor. Thus, the first output is a floating voltage rail that tracks the battery voltage within a designated voltage difference value.

Method 700 may perform operation 710 during which the variable gate voltage generator is used to vary a gate voltage of a second transistor. Accordingly, as similarly discussed above, the variable gate voltage generator provides an output to a second reference voltage generator. More specifically, the battery voltage is provided to the second transistor via a second resistor.

Method 700 may perform operation 712 during which a fixed voltage rail is generated based on a voltage difference across the second transistor. Accordingly, as similarly discussed above, a second output is taken from the drain of the second transistor and used as a second reference voltage. The voltage drop across the second transistor remains constant, and thus holds the second reference voltage to a constant value, and provides a fixed voltage rail.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
- receiving, at a voltage regulator, a voltage from a voltage source;
- generating, using the voltage regulator, a tracking current based on the received voltage, the tracking current having an amplitude that tracks changes in a voltage level of the voltage source;
- generating, using the voltage regulator, a first reference voltage based on the tracking current, the first reference voltage being a designated voltage less than the voltage source and tracking changes in the voltage level of the voltage source; and
- generating, using the voltage regulator, a second reference voltage based on the received voltage, the second reference voltage being a fixed voltage.

2. The method of claim 1, wherein the generating of the tracking current further comprises:
- providing the voltage and an output of an energy source to a differential amplifier; and
- providing an output of the differential amplifier to a first transistor.

3. The method of claim 2, wherein the energy source is a current source.

4. The method of claim 2, wherein the energy source is a voltage source.

5. The method of claim 2, wherein the first reference voltage is measured at a drain of the first transistor.

6. The method of claim 1, wherein the generating of the second reference voltage further comprises:
- providing the voltage to a second transistor, the second transistor having a source coupled to a circuit ground.

7. The method of claim 6, wherein the second reference voltage is measured at a drain of the second transistor.

8. The method of claim 7, wherein the second transistor is an N-type metal-oxide-semiconductor field-effect transistor.

9. The method of claim 1, wherein the voltage source is a battery.

10. A system comprising:
- a power supply; and
- a voltage regulator configured to:
  - receive a voltage from a voltage source;
  - generate a tracking current based on the received voltage, the tracking current having an amplitude that tracks changes in a voltage level of the voltage source;
  - generate a first reference voltage based on the tracking current, the first reference voltage being a designated voltage less than the voltage source and tracking changes in the voltage level of the voltage source; and generate a second reference voltage based on the received voltage, the second reference voltage being a fixed voltage.

11. The system of claim 10, wherein the voltage regulator is further configured to:

provide the voltage and an output of an energy source to a differential amplifier; and provide an output of the differential amplifier to a first transistor.

12. The system of claim 11, wherein the energy source is a current source.

13. The system of claim 11, wherein the energy source is a voltage source.

14. The system of claim 11, wherein the first reference voltage is measured at a drain of the first transistor.

15. The system of claim 10, wherein the voltage regulator is further configured to:

provide the voltage to a second transistor, the second transistor having a source coupled to a circuit ground, wherein the second reference voltage is measured at a drain of the second transistor.

16. A device comprising:

a voltage generator configured to receive a voltage from a voltage source;

a variable gate voltage generator configured to generate a tracking current based on the received voltage, the tracking current having an amplitude that tracks changes in a voltage level of the voltage source;

a first reference voltage generator configured to generate a first reference voltage based on the tracking current, the first reference voltage being a designated voltage less than the voltage source and tracking changes in the voltage level of the voltage source; and a second reference voltage generator configured to generate a second reference voltage based on the received voltage, the second reference voltage being a fixed voltage.

17. The device of claim 16, wherein the variable gate voltage generator is further configured to:

provide the voltage and an output of an energy source to a differential amplifier; and provide an output of the differential amplifier to a first transistor.

18. The device of claim 17, wherein the energy source is a current source.

19. The device of claim 17, wherein the energy source is a voltage source.

20. The device of claim 16, wherein the second reference voltage generator is further configured to:

provide the voltage to a second transistor, the second transistor having a source coupled to a circuit ground, wherein the second reference voltage is measured at a drain of the second transistor.

* * * * *